(12) United States Patent
Junio et al.

(10) Patent No.: US 10,749,857 B2
(45) Date of Patent: Aug. 18, 2020

(54) NETWORK MAPPING USING A FINGERPRINT

(71) Applicant: Expanse, Inc., San Francisco, CA (US)

(72) Inventors: Timothy Junio, San Francisco, CA (US); Matthew Kraning, San Francisco, CA (US)

(73) Assignee: EXPANSE, INC., San Francisco, CA (US)

( * ) Notice: Subject to any disclaimer, the term of this patent is extended or adjusted under 35 U.S.C. 154(b) by 0 days.

(21) Appl. No.: 15/276,632

(22) Filed: Sep. 26, 2016

(65) Prior Publication Data

US 2018/0091496 A1    Mar. 29, 2018

(51) Int. Cl.
*H04L 29/06* (2006.01)
*G06F 21/57* (2013.01)
*H04L 29/12* (2006.01)
*H04L 29/08* (2006.01)

(52) U.S. Cl.
CPC ........ *H04L 63/0823* (2013.01); *G06F 21/577* (2013.01); *H04L 61/1541* (2013.01); *H04L 61/35* (2013.01); *H04L 67/02* (2013.01)

(58) Field of Classification Search
CPC .. H04L 63/0823; H04L 61/1541; H04L 67/02
USPC ...................................................... 726/2–10
See application file for complete search history.

(56) References Cited

U.S. PATENT DOCUMENTS

| | | | |
|---|---|---|---|
| 9,716,727 B1* | 7/2017 | Seger | .................. H04L 63/1491 |
| 2004/0268142 A1 | 12/2004 | Karjala | |
| 2006/0036847 A1* | 2/2006 | Bush | .................. H04L 29/12783 |
| | | | 713/153 |
| 2006/0106866 A1 | 5/2006 | Green | |
| 2008/0225749 A1* | 9/2008 | Peng | ..................... H04L 12/281 |
| | | | 370/254 |
| 2012/0204243 A1* | 8/2012 | Wynn | ............... H04W 12/0806 |
| | | | 726/5 |
| 2012/0323883 A1* | 12/2012 | Figg | ....................... G06Q 10/10 |
| | | | 707/709 |
| 2013/0174263 A1* | 7/2013 | Nunez Di Croce | .. G06F 21/577 |
| | | | 726/25 |

(Continued)

FOREIGN PATENT DOCUMENTS

| | | |
|---|---|---|
| CN | 106888106 A | 6/2017 |
| JP | 2001148715 A | 5/2001 |

(Continued)

OTHER PUBLICATIONS

Meixner et al., "Disaster-resilient virtual-network mapping and adaptation in optical networks," 2013 17th International Conference on Optical Networking Design and Modeling (ONDM) Year: 2013 | Conference Paper | Publisher: IEEE.*

(Continued)

*Primary Examiner* — Roderick Tolentino
(74) *Attorney, Agent, or Firm* — Perkins Coie LLP (57) ABSTRACT

A system for network mapping includes an interface and a processor. The interface is configured to receive an indication to scan a set of addresses using a fingerprint. The processor is configured to for an address of the set of addresses: receive a response associated with the address; determine whether the response matches the fingerprint; and store the address in a client network database in the event the response matches the fingerprint.

11 Claims, 11 Drawing Sheets

(56) References Cited

U.S. PATENT DOCUMENTS

| | | | |
|---|---|---|---|
| 2015/0150072 A1* | 5/2015 | Doctor | H04L 63/20 726/1 |
| 2016/0057101 A1* | 2/2016 | Hugard, IV | H04L 41/12 709/220 |
| 2016/0106866 A1 | 4/2016 | Fisher et al. | |
| 2016/0174072 A1 | 6/2016 | Allyn | |
| 2016/0330245 A1* | 11/2016 | Bell | H04L 63/1433 |
| 2018/0139219 A1* | 5/2018 | Sabata | H04L 41/06 |

FOREIGN PATENT DOCUMENTS

| | | |
|---|---|---|
| JP | 2003258795 A | 9/2003 |
| JP | 2005328427 A | 11/2005 |

OTHER PUBLICATIONS

Gu et al., "Survivable Cloud Network Mapping for Disaster Recovery Support," IEEE Transactions on Computers Year: 2015 | vol. 64, Issue: 8 | Journal Article | Publisher: IEEE.*
Australian Search Report dated Jan. 22, 2020 for Australian Application No. 2017331053, 5 pages.
Anonymous, "Network Enumeration—Wikipedia", URL:https://en.widipedia.org/w/index.php?title=Network_enumeration&oldid-734628180, Jan. 28, 2020, 2 pages.
Canadian Office Action dated Apr. 22, 2020 for Canadian Patent Application No. 3,038,518, 6 pages.
Japanese Office Action dated Apr. 14, 2020 for Japanese Application No. 2019-537743.

* cited by examiner

NETWORK MAPPING USING A
FINGERPRINT

BACKGROUND OF THE INVENTION

Internet connected assets (e.g., computers, mobile devices, server systems, client systems, internet-of-things devices, etc.) include computing systems in communication with the Internet. Internet connected assets commonly include one or more publicly addressable communication ports, allowing any internet connected device to query the internet connected assets. Some devices allow a range of connection types (e.g., hypertext transfer protocol (HTTP) connections hypertext transfer protocol-secure (HTTPS) connections, file transfer protocol (FTP) connections, file transfer protocol-secure (FTPS) connections, telnet connections, secure socket shell (SSH) connections, etc.) over the one or more publicly accessible ports. Internet connected assets can comprise a wide range of different types of hardware devices running a wide range of software including a wide range of configuration options, creating a myriad of possibilities for security vulnerabilities. A typical systems administrator may not be aware of every detail of every system under his or her watch, creating a problem where system vulnerabilities may go undetected and unfixed.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A system for network mapping using a fingerprint comprises an interface configured to receive an indication to scan a set of addresses using a fingerprint, and a processor configured to: for an address of the set of addresses, receive a response associated with the address, determine whether the response matches the fingerprint, and in the event the response matches the fingerprint, store the address in a client network database. In some embodiments, the system for network mapping using a fingerprint comprises a memory coupled to the processor and configured to provide the processor with instructions.

In some embodiments, a system for network mapping using a fingerprint comprises a system for identifying computer systems associated with a client network. The fingerprint comprises an identifying criterion or criteria for a computer system. In some embodiments, the fingerprint comprises a set of publicly available information known to be associated with the client network. In various embodiments, a fingerprint comprises a set of open ports (e.g., a specific set of open ports that have been determined to be correlated with the client network), a set of services and associated ports, an encryption certificate, a public encryption key, a text string, a text substring, a text string pattern, a domain name, a domain name pattern, a host name, a host name pattern, a combination of identifying elements, or any other appropriate fingerprint information. In some embodiments, the system for network mapping maps a client network by exhaustively scanning network data and identifying network data that matches the fingerprint. In some embodiments, the system for network mapping scans data collected by a network scanner and stored in a network database (e.g., a network scanning tool first collects all possible information about the network—e.g., the entire Internet—and stores it in a network information database; the system for network mapping then scans the data in the network information database for systems with stored information that matches the fingerprint). In some embodiments, the system for network mapping scans network addresses on the Internet and analyzes received information for systems that return information that matches the fingerprint. When a system is found that is determined to be part of the client network (e.g., its information matches the fingerprint information), the address associated with the system is stored in a client network database. In some embodiments, other system information is additionally stored in the client network database.

Figure 1:
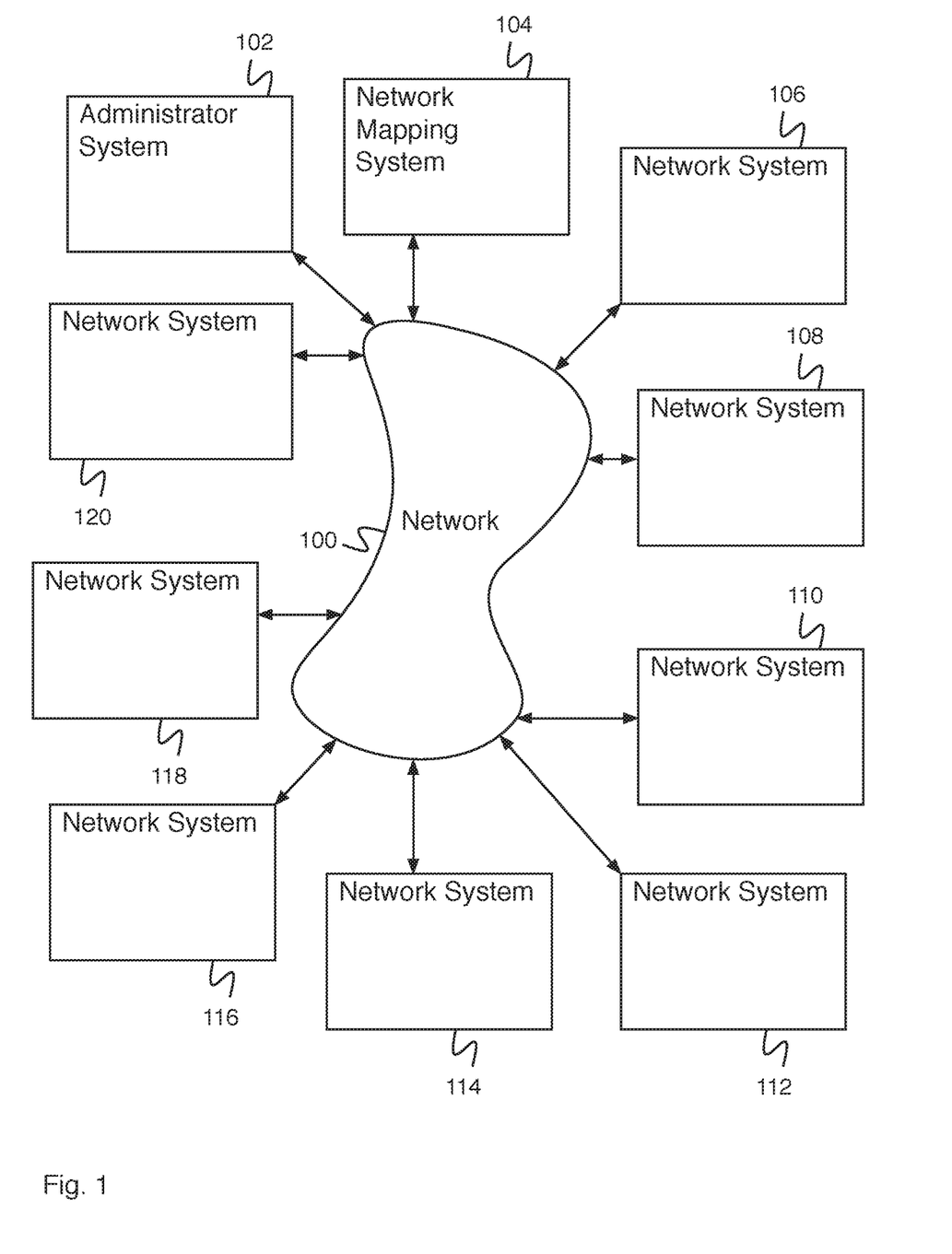
FIG. 1 is a block diagram illustrating an embodiment of a network system.

FIG. 1 is a block diagram illustrating an embodiment of a network system. In some embodiments, the network system of FIG. 1 comprises a system for network mapping using a fingerprint. In the example shown, FIG. 1 comprises network 100. In various embodiments, network 100 comprises one or more of the following: a local area network, a wide area network, a wired network, a wireless network, the Internet, an intranet, a storage area network, or any other appropriate communication network. Administrator system 102 and network mapping system 104 communicate via network 100. Administrator system 102 comprises a system for an administrator. In various embodiments, administrator system 102 comprises a system for an administrator to access applications on an application system, to access data on a database system, to indicate to network mapping system 104 to perform a network mapping process, to receive data from network mapping system 104, to configure a network system (e.g., network system 106), to receive data from a network system, or for any other appropriate purpose. In some embodiments, administrator system 102 comprises a processor and a memory. Network mapping system 104 comprises a system for mapping a client network. In some embodiments, network mapping system 104 comprises a system for scanning data associated with network systems in response to a command from administrator system 102. In some embodiments, network mapping system 104 comprises a system for scanning data associated with a set of network systems (e.g. network system 106, network system 108, network system 110, network system 112, network system 114, network system 116, network system 118, and network system 120). In some embodiments, scanning data associated with a set of network systems comprises analyzing previously stored data associated with the set of network systems. In some embodiments, scanning data associated with a set of network systems comprises providing a payload to one or more network systems of the set of network systems and analyzing the received response, in the event that a response is received. In some embodiments, network mapping system 104 comprises a processor and a memory. Each network system of FIG. 1 (e.g., network system 106) comprises an Internet connected system (e.g., a firewall, a router, a switch, a desktop computer, a laptop computer, a smartphone, a tablet computer, a server system, an internet-of-things device, etc.). In various embodiments, the system of FIG. 1 comprises 8, 13, 197, 2222, one million, one hundred million, or any other appropriate number of network systems. In some embodiments, each network system of FIG. 1 is associated with an Internet address. In some embodiments, an Internet address comprises an Internet Protocol (IP) address.

In some embodiments, network mapping system 104 is one of a plurality of network mapping systems. For example, in order to scan addresses more efficiently a plurality of network mapping systems are instructed to scan addresses.

Figure 2:
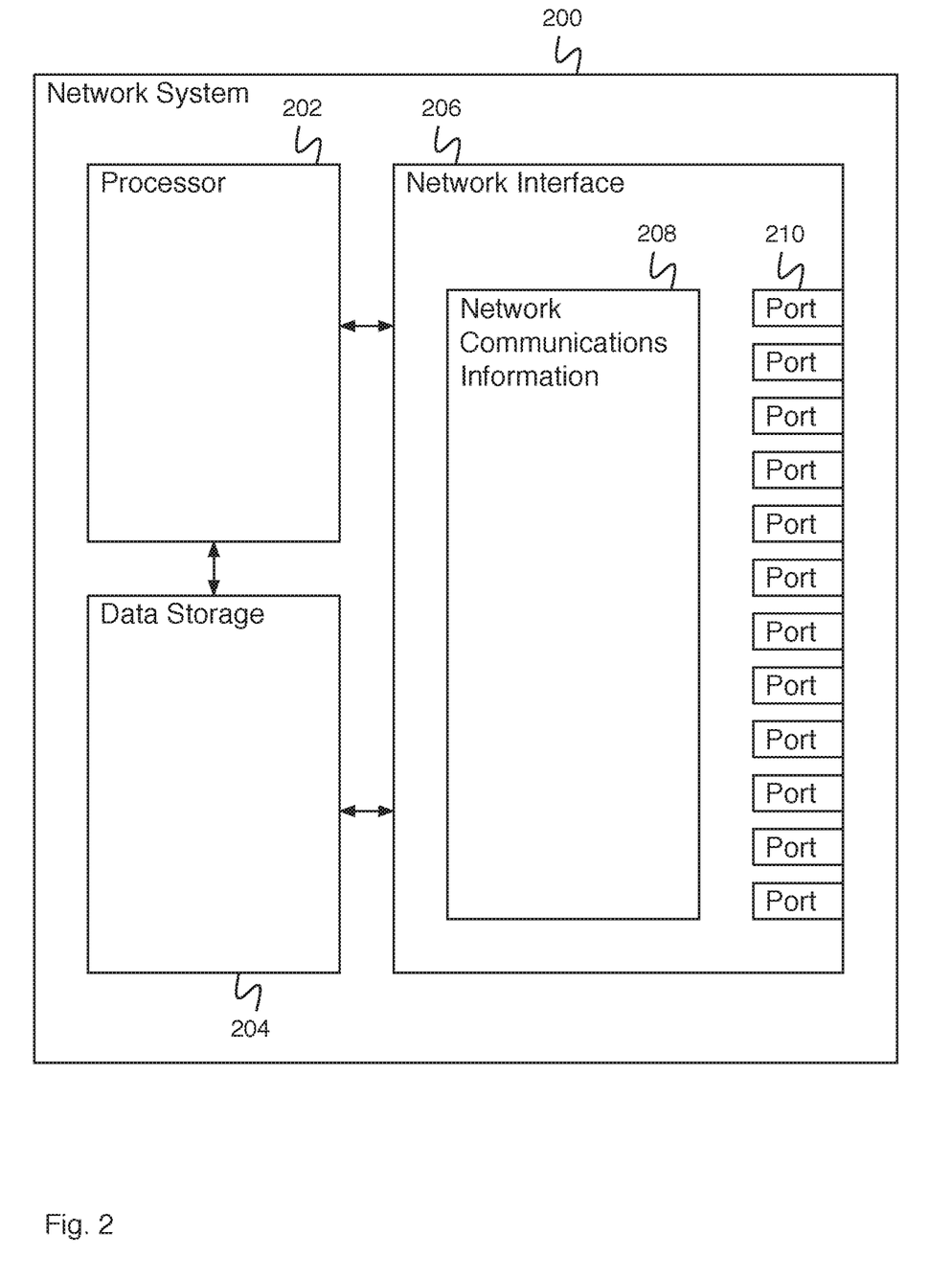
FIG. 2 is a block diagram illustrating an embodiment of a network system.

FIG. 2 is a block diagram illustrating an embodiment of a network system. In some embodiments, network system 200 comprises a network system of FIG. 1 (e.g., network system 106, network system 108, network system 110, network system 112, network system 114, network system 116, network system 118, or network system 120). In the example shown, network system 200 comprises processor 202, data storage 204, and network interface 206. In some embodiments, network system 200 comprises an Internet connected asset (e.g., a router, a switch, a firewall, a desktop computer, a laptop computer, a smartphone, a tablet computer, a server system, an Internet-of-things device, or any other appropriate Internet connected asset). In various embodiments, processor 202 comprises a processor for executing instructions, processing data, responding to commands, etc. In various embodiments, processor 202 comprises a general-purpose processor, a microcontroller, a parallel processing system, a cluster of processors, or any other appropriate processor. In various embodiments, data storage 204 comprises a data storage for storing data, for storing instructions for processor 202, for storing configuration information, or for storing any other appropriate information. In various embodiments, data storage 204 comprises one or more of a volatile memory, a non-volatile memory, a magnetic memory, an optical memory, a phase-change memory, a semiconductor memory, a disc memory, a tape memory, or any other appropriate memory. Network interface 206 comprises a network interface for communicating with a network. In the example shown, network interface 206 comprises network communications information 208 and a plurality of ports (e.g., port 210). In various embodiments, network communications information comprises network communications software, network communications settings, network communications data, or any other appropriate network communications information. The plurality of ports comprises physical ports (e.g., plugs for connecting cables to network system 200) or virtual ports (e.g., virtual communications channels identified by a virtual port number). In some embodiments, network interface 206 comprises a network address (e.g., a network address assigned by an external network addressing authority). In some embodiments, communication with network system 200 is specified by indicating the network address of network 200 along with a port number. In some embodiments, some ports of network interface 206 are configured for communication (e.g., comprising open ports) and some are configured to not respond to communication. In some embodiments, open port configuration information is stored in network communications information 208. In some embodiments, some ports are associated with one or more specific communications services (e.g., hypertext transmission protocol (HTTP), file transfer protocol (FTP), secure shell (SSH), etc.). In some embodiments, configuration information associating services with ports is stored in network communications information 208. In some embodiments, network communications information 208 comprises encryption information (e.g., a public SSH key, a certificate, etc.). In some embodiments, network communications information 208 comprises a network system name or names (e.g., a hostname, a domain name, a set of hostnames, a hostname pattern, etc.). In some embodiments, network communications information comprises text information associated with a service or a set of services (e.g., a welcome text, a connection refused text, a service not supported text, a file not found text, or any other appropriate text information). In some embodiments, network interface 206 comprises a set of network hardware (e.g., a modem) running a set of communications software that has been configured according to a set of communications specifications.

Figure 3:
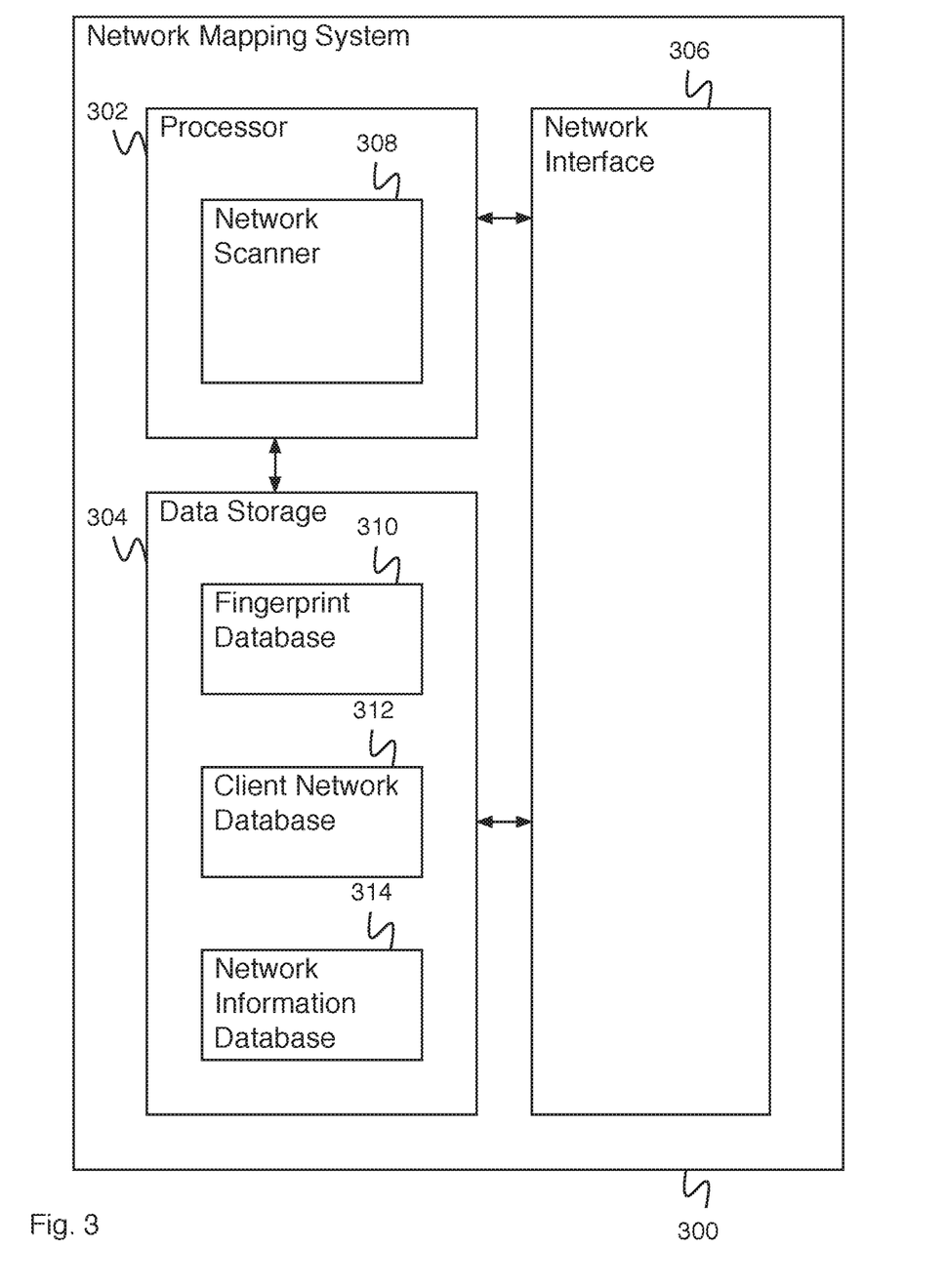
FIG. 3 is a block diagram illustrating an embodiment of a network mapping system.

FIG. 3 is a block diagram illustrating an embodiment of a network mapping system. In some embodiments, network mapping system 300 comprises network mapping system 104 of FIG. 1. In some embodiments, network mapping system 300 comprises a server system. In the example shown, network mapping system 300 comprises processor 302, data storage 304, and network interface 306. In some embodiments, processor 302 comprises a processor for executing instructions, processing data, responding to commands, or any other appropriate processor function. In various embodiments, processor 302 comprises a general-purpose processor, a microcontroller, a parallel processing system, a cluster of processors, or any other appropriate processor. In some embodiments, processor 302 comprises network scanner 308. In various embodiments, network scanner 308 comprises software and/or hardware implementing network mapping system functionality. In various embodiments, data storage 304 comprises a data storage for storing data, for storing instructions for processor 302, for storing configuration information, or for storing any other appropriate information. In various embodiments, data storage 304 comprises one or more of a volatile memory, a non-volatile memory, a magnetic memory, an optical memory, a phase-change memory, a semiconductor memory, a disc memory, a tape memory, or any other appropriate memory. In the example shown, data storage 304 comprises fingerprint database 310 for storing fingerprints for identifying network systems. In some embodiments, fingerprints stored in fingerprint database are each associated with a client network. In some embodiments, a fingerprint comprises one or more network identifying characteristics. In some embodiments, network identifying characteristics comprise network communications information settings (e.g., a set of open ports, a set of services and associated ports, encryption information, host name information, domain name information, text information, etc.).

In some embodiments, data storage 304 additionally comprises client network database 312 for storing client network information (e.g., Internet addresses—e.g., IPv4 or IPv6 addresses—associated with the client network, network system information associated with network systems associated with the client network, etc.). In some embodiments, after a network mapping process is executed, client network database 312 comprises a set of client network information describing the extent of the client network (e.g., identifying all network systems found that are associated with the client network). Data storage 304 comprises network information database 314 for storing network information. In some embodiments, network information comprises network information received as a result of scanning a network. In some embodiments, network information comprises responses compiled by scanning the Internet. In some embodiments, scanning the Internet comprises providing a payload (e.g., a predetermined data packet or set of packets) to a set of Internet addresses. In some embodiments, scanning a network comprises collecting network information from a set of network systems. In some embodiments, scanning a network comprises collecting network information from all accessible network systems. In various embodiments, network information comprises network communications information settings, network addresses, information received by interactively querying network systems (e.g. information received by performing a follow-up probe in response to an indication of an active service running on the network system). In some embodiments, network information is stored remotely (e.g., on a storage server, on a different network system, on cloud storage, etc.).

In the example shown, network interface 306 comprises a network interface for interacting with remote systems via a network. In some embodiments, network interface 306 comprises a network interface configured for high bandwidth communication.

Figure 4:
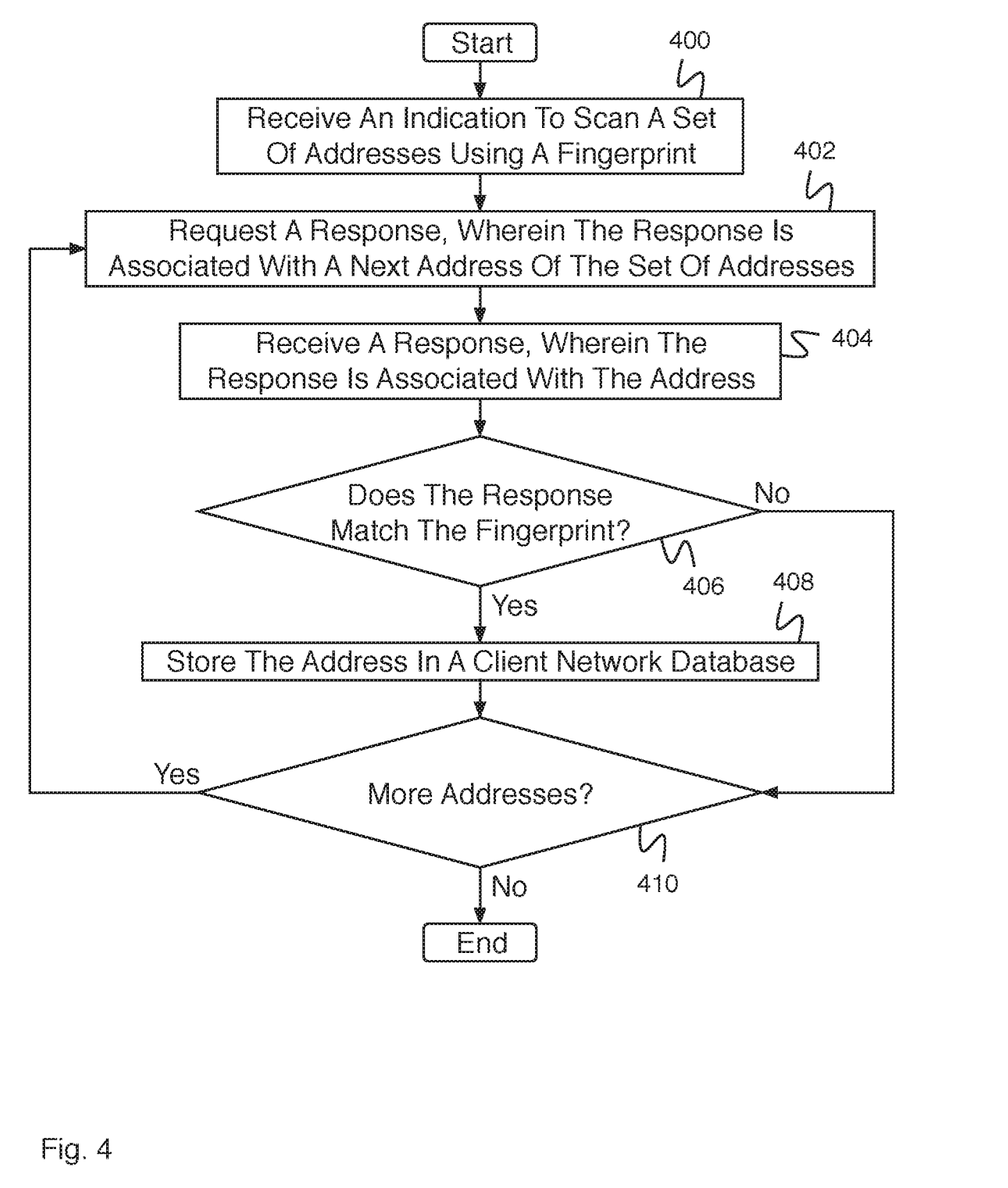
FIG. 4 is a flow diagram illustrating an embodiment of a process for network mapping.

FIG. 4 is a flow diagram illustrating an embodiment of a process for network mapping. In some embodiments, the process of FIG. 4 is executed by network mapping system 104 of FIG. 1. In the example shown, in 400, an indication is received to scan a set of addresses using a fingerprint. In some embodiments, the set of addresses comprises all Internet addresses. In some embodiments, the set of addresses comprises a predetermined network (e.g., a predetermined subset of addresses). In some embodiments, the indication to scan is received from an administrator system. In some embodiments, the fingerprint is received as part of the indication to scan. In some embodiments, the fingerprint is stored by the network mapping system. In 402, a response is requested, wherein the response is associated with a next address of the set of addresses. In some embodiments, the next address of the set of addresses comprises the first address of the set of addresses. In some embodiments, the response is requested from a network system associated with the address (e.g., via a network interface and a network). In some embodiments, the response is requested from a network information database (e.g., network information database 314 of FIG. 3). In some embodiments, all available information is requested from the network system as part of requesting the response (e.g., network communications information settings, network addresses, information received by interactively querying the network system, etc.). In some embodiments, information requested is based at least in part on the fingerprint (e.g., only enough information is requested to determine whether the response matches the fingerprint—e.g., information that is not tested by the fingerprint is not requested). In 404, a response is received, wherein the response is associated with the address. In 406, it is determined whether the response matches the fingerprint. In some embodiments, determining whether the response matches the fingerprint comprises comparing a fingerprint criterion or criteria with response data. In the event it is determined that the response does not match the fingerprint, control passes to 410. In the event it is determined that the response matches the fingerprint, control passes to 408. In 408, the address is stored in a client network database. In some embodiments, the response is additionally stored in the client network database. In 410, it is determined whether there are more addresses (e.g., more addresses of the set of addresses). In the event it is determined that there are more addresses, control passes to 402. In the event it is determined that there are not more addresses, the process ends.

Figure 5:
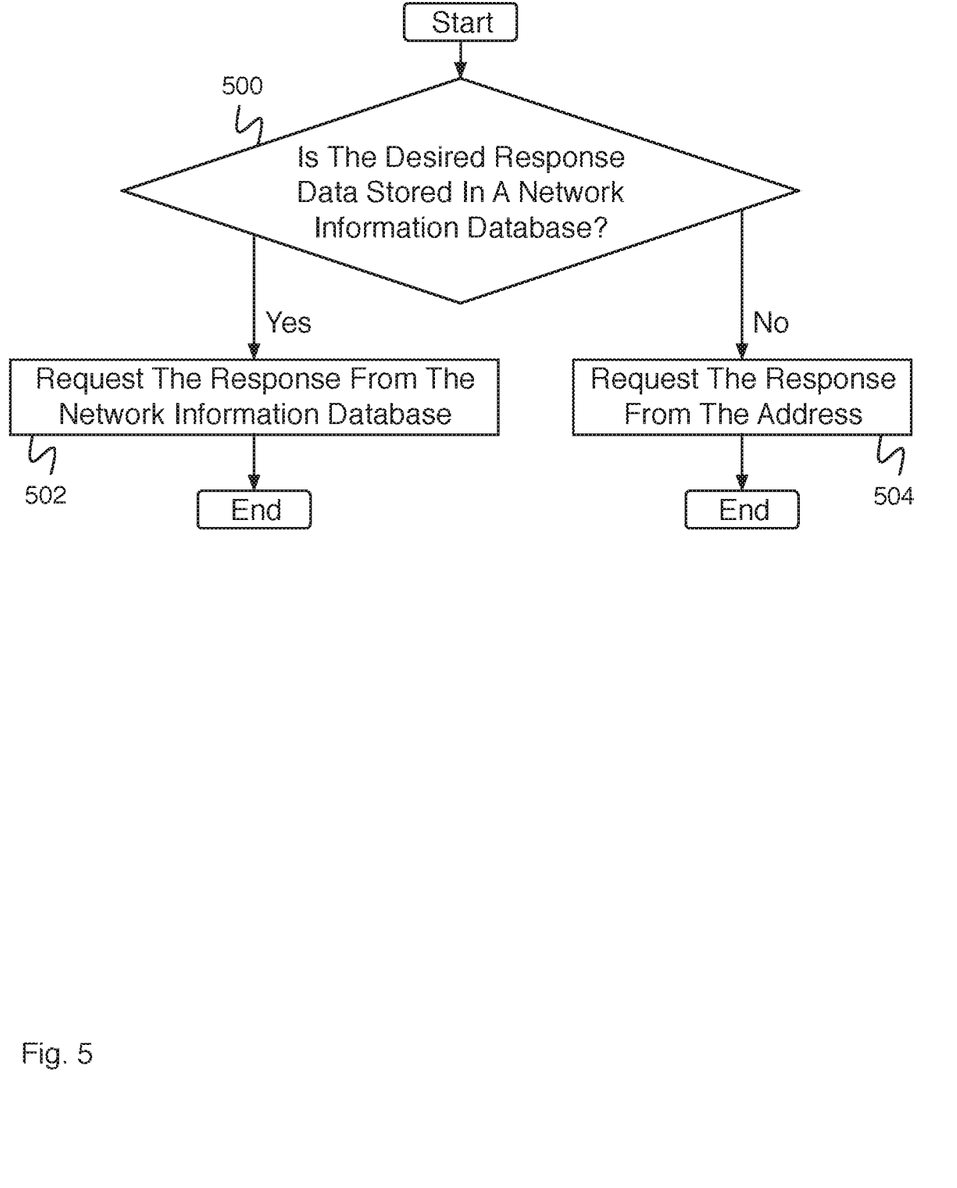
FIG. 5 is a flow diagram illustrating an embodiment of a process for requesting a response.

FIG. 5 is a flow diagram illustrating an embodiment of a process for requesting a response, wherein the response is associated with a next address of a set of addresses. In some embodiments, the process of FIG. 5 implements 402 of FIG. 4. In the example shown, in 500, it is determined whether the desired response data is stored in a network information database. In some embodiments, determining whether the desired response data is stored in a network information database comprises querying the network information database with the address associated with the response. In the event it is determined that the desired response data is stored in the network information database, control passes to 502. In 502, the response is requested from the network information database, and the process ends. In the event it is determined in 500 that the desired response data is not stored in the network information database, control passes to 504. In 504, the response is requested from the address (e.g., via a network interface and a network). In some embodiments, requesting a response from the address comprises providing a payload to the address (e.g., providing a predetermined data packet or sequence of packets to the address).

Figure 6:
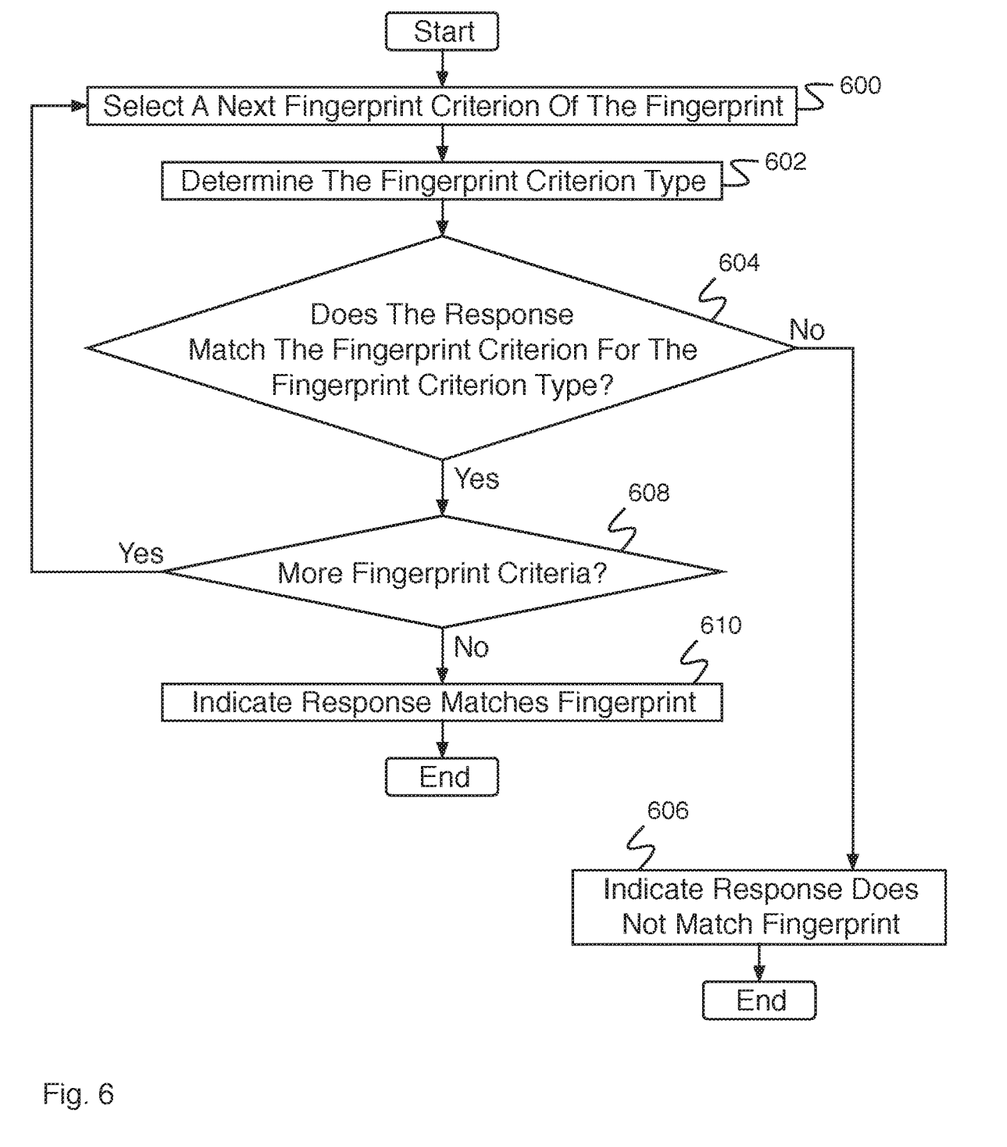
FIG. 6 is a flow diagram illustrating an embodiment of a process for determining whether a response matches a fingerprint.

FIG. 6 is a flow diagram illustrating an embodiment of a process for determining whether a response matches a fingerprint. In some embodiments, the process of FIG. 6 implements 406 of FIG. 4. In the example shown, in 600, a next fingerprint criterion of the fingerprint is selected. In some embodiments, the next fingerprint criterion comprises the first fingerprint criterion. In 602, the fingerprint criterion type is determined. In various embodiments, the fingerprint criterion type comprises a set of open ports criterion type, a set of services and associated ports criterion type, a certificate criterion type, a public encryption key criterion type, a text string criterion type, a text substring criterion type, a text string pattern criterion type, a domain name criterion type, a domain name pattern criteria type, a host name criterion type, a host name pattern criterion type, or any other appropriate criterion type. In 604, it is determined whether the response matches the fingerprint criterion for the fingerprint criterion type. In the event it is determined that the response does not match the fingerprint criterion for the fingerprint criterion type, control passes to 606. In 606, the process indicates that the response does not match the fingerprint, and the process ends. In the event it is determined that the response matches the fingerprint criterion for the fingerprint criterion type in 604, control passes to 608. In 608, it is determined whether there are more fingerprint criteria. In the event it is determined that there are more fingerprint criteria, control passes to 600. In the event it is determined that there are not more fingerprint criteria, control passes to 610. In 610, the process indicates that the response matches the fingerprint. In the example shown, the response is determined to match the fingerprint only in the event that the response is determined to match all fingerprint criteria of the fingerprint.

Figure 7:
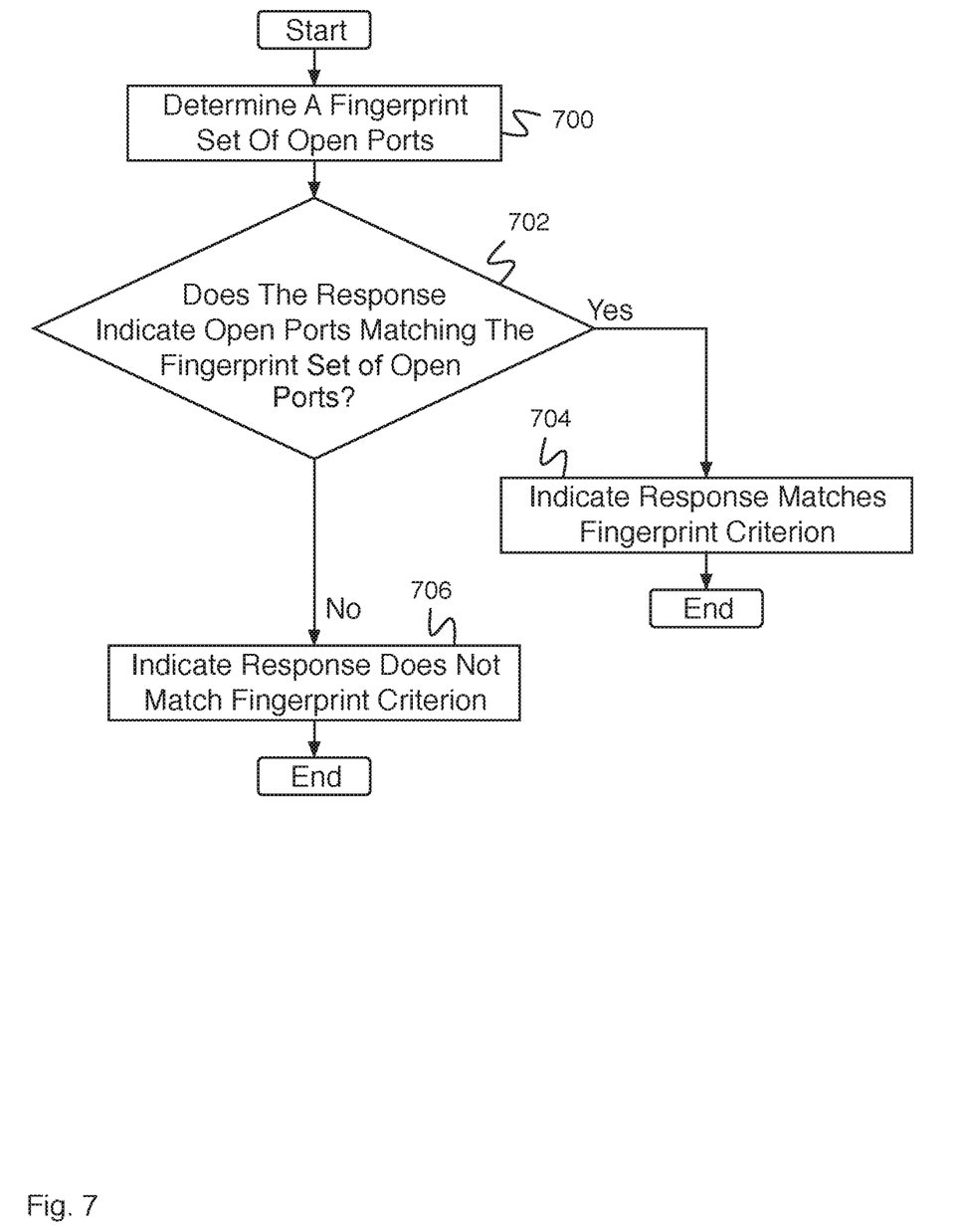
FIG. 7 is a flow diagram illustrating an embodiment of a process for determining whether a response matches a fingerprint criterion for a fingerprint criterion type comprising a set of open ports fingerprint criterion type.

FIG. 7 is a flow diagram illustrating an embodiment of a process for determining whether a response matches a fingerprint criterion for a fingerprint criterion type comprising a set of open ports fingerprint criterion type. In some embodiments, the diagram of FIG. 7 implements 604 of FIG. 6 in the event the fingerprint criterion type is determined to be an open ports fingerprint criterion type. In the example shown, in 700, a fingerprint set of open ports (e.g., a set of open ports indicated by the fingerprint criterion) is determined. In some embodiments, a set of open ports comprises a set of port numbers associated with open ports (e.g., ports 22, 80, 8080, and 9999). In various embodiments, the set of open ports comprises 1, 3, 8, 14, 99, or any other appropriate number of open ports. In various embodiments, the set of open ports fingerprint criterion is a set of ports that are individually seen frequently (e.g., ports 22, 23, 25, 80, 443 and 8080). In various embodiments, the set of open ports fingerprint criterion is a set of open ports some of which are individually seen open frequently and some of which are individually seen open infrequently, (e.g., ports 80 8080 that are open frequently—for example, appearing more often than a threshold for frequent, and 47808 that is open infrequently—for example, appearing less often than a threshold for infrequent). In various embodiments, the set of open ports fingerprint criterion is a set of ports all of which are individually seen open infrequently, (e.g., ports 1433, 3306, and 5432). In 702, it is determined whether the response indicates open ports matching the fingerprint set of open ports. In the event it is determined that the response indicates open ports matching the fingerprint set of open ports, control passes to 704. In 704, the process indicates that the response matches the fingerprint criterion, and the process ends. In the event it is determined in 702 that the response does not indicate open ports matching the fingerprint set of open ports, control passes to 706. In 706, the process indicates that the response does not match the fingerprint criterion.

Figure 8:
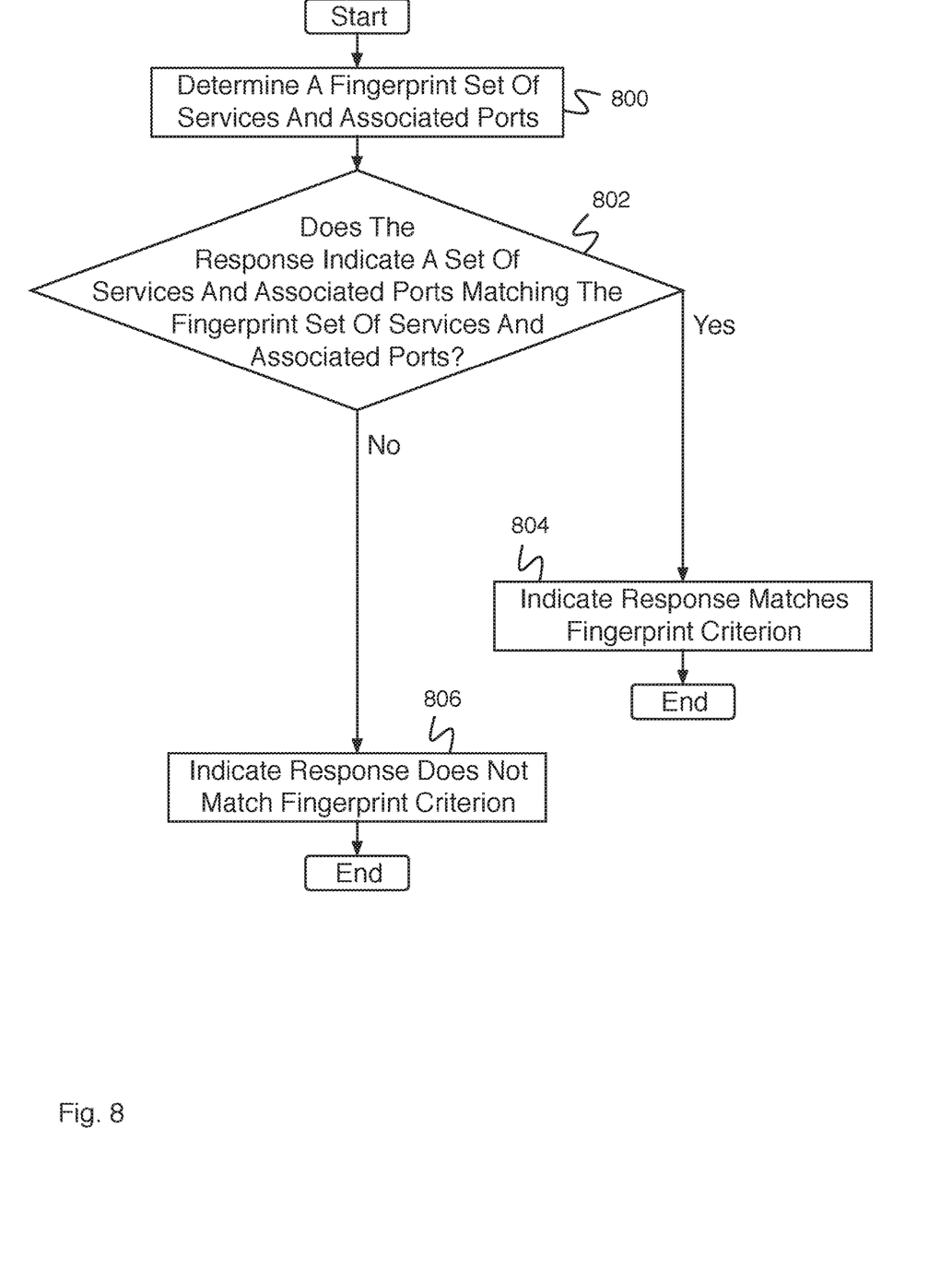
FIG. 8 is a flow diagram illustrating an embodiment of a process for determining whether a response matches a fingerprint criterion for a fingerprint criterion type comprising a set of services and associated ports fingerprint criterion type.

FIG. 8 is a flow diagram illustrating an embodiment of a process for determining whether a response matches a fingerprint criterion for a fingerprint criterion type comprising a set of services and associated ports fingerprint criterion type. In some embodiments, the diagram of FIG. 8 implements 604 of FIG. 6 in the event the fingerprint criterion type is determined a set of services and associated ports fingerprint criterion type. In the example shown, in 800, a fingerprint set of services and associated ports (e.g., a set of services and associated ports indicated by the fingerprint criterion) is determined. In some embodiments, a set of services and associated ports comprises a set of port numbers (e.g., ports 122, 1000, and 4444), each port associated with a network service (e.g., SSH, HTTP, HTTPS, telnet, etc.). In various embodiments, the set of services and associated ports comprises 1, 3, 8, 14, 99, or any other appropriate number of services and associated ports. In various embodiments, the set of services and associated ports fingerprint criterion comprises a set of ports that are individually seen frequently (e.g., port/service pairs 22 (SSH), 23 (telnet), 25 (SMTP), 80 (HTTP), 443 (HTTPS) and 8080 (HTTP)—for example, a set of ports that are seen more often than a threshold frequency). In various embodiments, the set of services and associated ports fingerprint criterion is a set of services and associated ports some of which are individually seen frequently and some of which are individually seen infrequently, (e.g., ports 80 (HTTP), 8080 (HTTP) that are open frequently—for example, appearing more often than a threshold for frequent, and 47808 (BACnet) that is open infrequently—for example, appearing less often than a threshold for infrequent). In various embodiments, the set of services and associated ports fingerprint criterion is a set of set of services and associated ports all of which are individually seen open infrequently, (e.g., ports 1433 (MSSQL), 3306 (MySQL), and 5432 (Postgres)—for example, appearing less often than a threshold for infrequent). In 802, it is determined whether the response indicates services and associated ports matching the fingerprint services and associated ports. In the event it is determined that the response indicates services and associated ports matching the fingerprint services and associated ports, control passes to 804. In 804, the process indicates that the response matches the fingerprint criterion, and the process ends. In the event it is determined in 802 that the response does not indicate services and associated ports matching the fingerprint services and associated ports, control passes to 806. In 806, the process indicates that the response does not match the fingerprint criterion.

Figure 9:
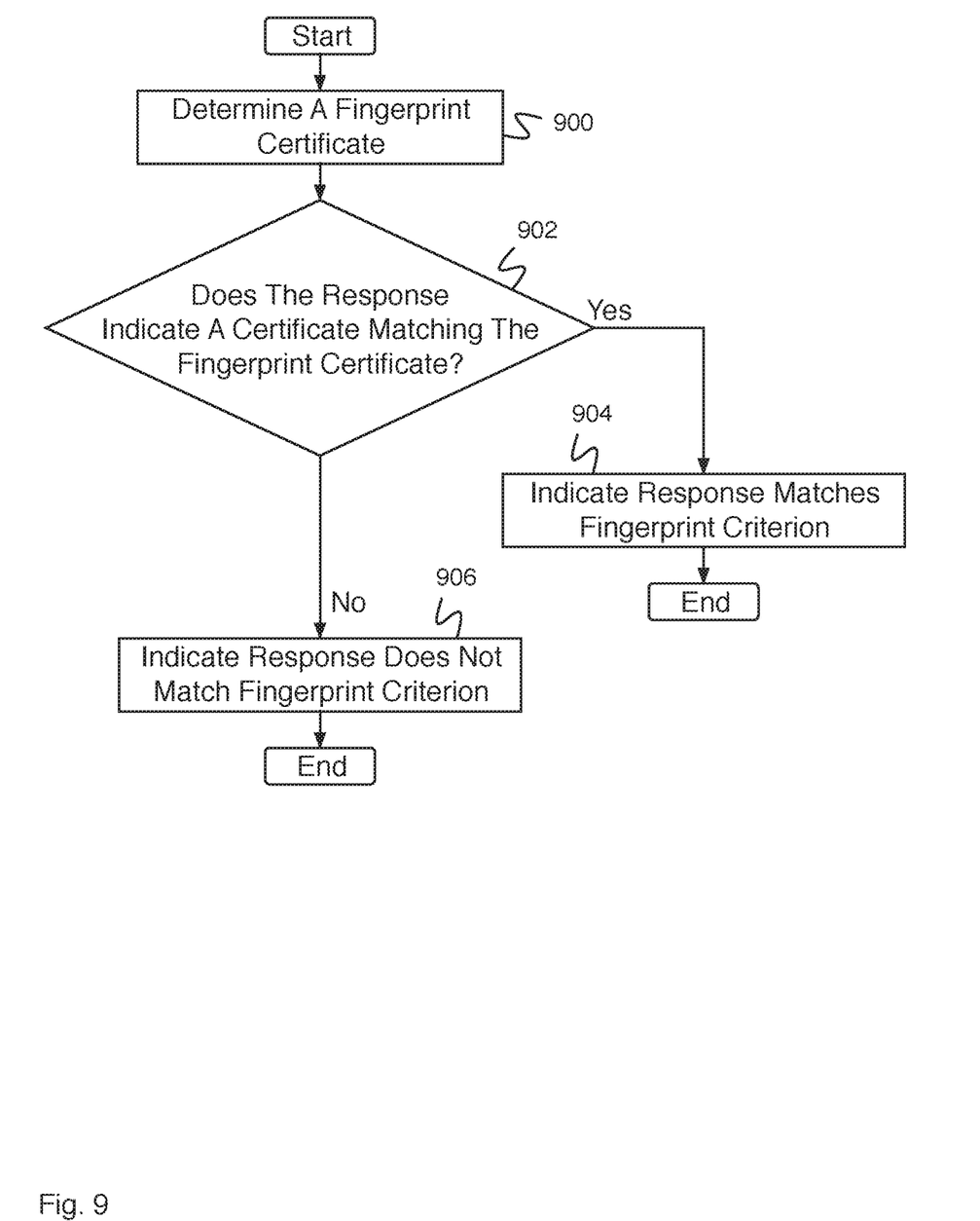
FIG. 9 is a flow diagram illustrating an embodiment of a process for determining whether a response matches a fingerprint criterion for a fingerprint criterion type comprising a certificate fingerprint criterion type.

FIG. 9 is a flow diagram illustrating an embodiment of a process for determining whether a response matches a fingerprint criterion for a fingerprint criterion type comprising a certificate fingerprint criterion type. In some embodiments, the diagram of FIG. 9 implements 604 of FIG. 6 in the event the fingerprint criterion type is determined to be a certificate fingerprint criterion type. In the example shown, in 900, a fingerprint certificate (e.g., a certificate indicated by the fingerprint criterion) is determined. In some embodiments, a certificate fingerprint comprises an SSL (e.g., secure socket layer) certificate. In some embodiments, a certificate fingerprint comprises a transport layer security (TLS) certificate. In various embodiments, a certificate fingerprint comprises one or more of an organization name, an organization location, an organization hostname, an organization domain name, an organization server name, a Serial Number, a cryptographic key, Subject common name (CN), Issuer common name (CN), Issuer organizational unit (OU) Name, Issuer Org Name, Subject Org Name, Subject OU name, and any other appropriate information. In various embodiments, the certificate fingerprint criterion comprises an exact match or a fuzzy string match or regular expression match on one of more of the above certificate fingerprint types, or any other appropriate match. In 902, it is determined whether the response indicates a certificate matching the fingerprint certificate. In the event it is determined that the response indicates a certificate matching the fingerprint certificate, control passes to 904. In 904, the process indicates that the response matches the fingerprint criterion, and the process ends. In the event it is determined in 902 that the response does not indicate a certificate matching the fingerprint certificate, control passes to 906. In 906, the process indicates that the response does not match the fingerprint criterion.

Figure 10:
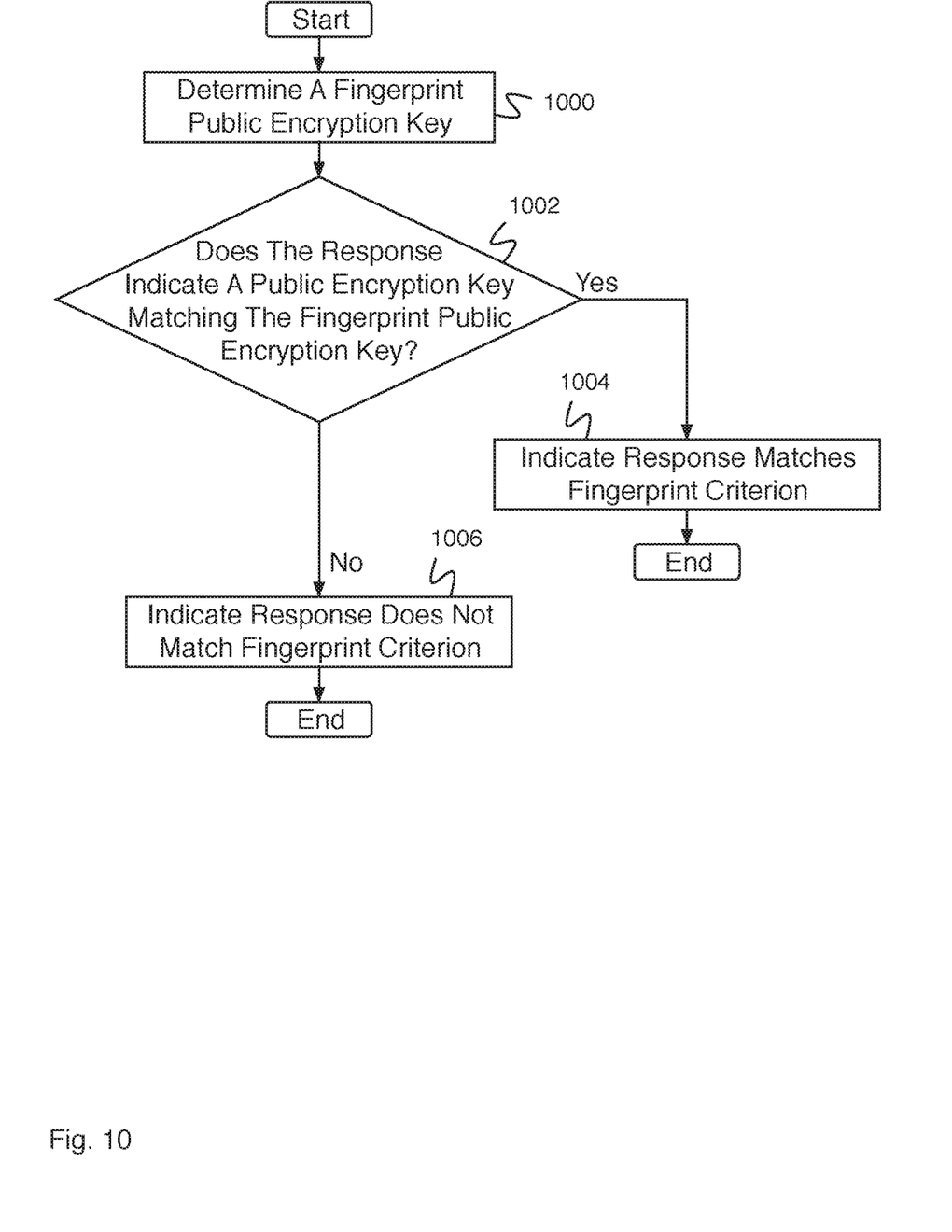
FIG. 10 is a flow diagram illustrating an embodiment of a process for determining whether a response matches a fingerprint criterion for a fingerprint criterion type comprising a public encryption key fingerprint criterion type.

FIG. 10 is a flow diagram illustrating an embodiment of a process for determining whether a response matches a fingerprint criterion for a fingerprint criterion type comprising a public encryption key fingerprint criterion type. In some embodiments, the diagram of FIG. 10 implements 604 of FIG. 6 in the event the fingerprint criterion type is determined to be a public encryption key fingerprint criterion type. In the example shown, in 1000, a fingerprint public encryption key (e.g., a public encryption key indicated by the fingerprint criterion) is determined. In some embodiments, a public encryption key comprises an SSH public encryption key, an SSL public encryption key, a TLS public encryption key, an HTTPS public encryption key, or any other appropriate public encryption key. In some embodiments, a public encryption key comprises encryption information for sending encrypted information (e.g., to the system providing the public encryption key). In 1002, it is determined whether the response indicates a public encryption key matching the fingerprint public encryption key. In the event it is determined that the response indicates a public encryption key matching the fingerprint public encryption key, control passes to 1004. In 1004, the process indicates that the response matches the fingerprint criterion, and the process ends. In the event it is determined in 1002 that the response does not indicate a public encryption key matching the fingerprint public encryption key, control passes to 1006. In 1006, the process indicates that the response does not match the fingerprint criterion.

Figure 11:
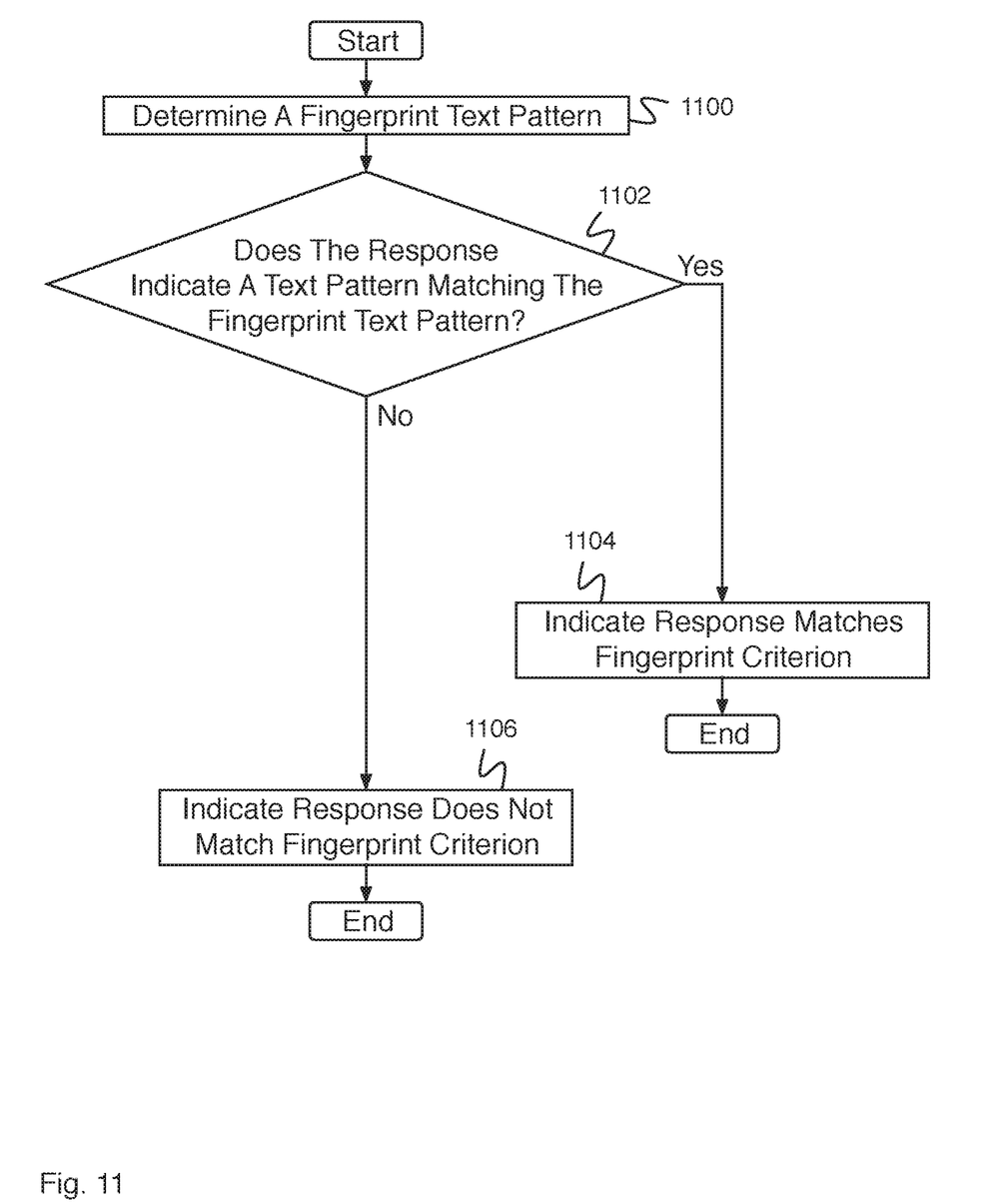
FIG. 11 is a flow diagram illustrating an embodiment of a process for determining whether a response matches a fingerprint criterion for a fingerprint criterion type comprising a text pattern fingerprint criterion type.

FIG. 11 is a flow diagram illustrating an embodiment of a process for determining whether a response matches a fingerprint criterion for a fingerprint criterion type comprising a text pattern fingerprint criterion type. In some embodiments, the diagram of FIG. 11 implements 604 of FIG. 6 in the event the fingerprint criterion type is determined to be a text pattern fingerprint criterion type. In the example shown, in 1100, a fingerprint text pattern (e.g., a text pattern indicated by the fingerprint criterion) is determined. In various embodiments, a text pattern comprises a text string, a regular expression, a hostname, a hostname pattern, a domain name, a domain name pattern, a company name, an organization name, an administrator name, a user identifier, or any other appropriate text pattern. In various embodiments, the text pattern criterion comprises a subsidiary name, past name of an organization, names of groups or divisions of an organization, common aliases or Doing Business As (DBA) names of an organization, names of products and service lines of an organization, or any other appropriate text pattern. In 1102, it is determined whether the response indicates a text pattern matching the fingerprint text pattern. In various embodiments, determining whether a response text pattern matches a fingerprint text pattern comprises determining whether the fingerprint text pattern is identical to the response text pattern, determining whether the fingerprint text pattern comprises a substring of the response text pattern, determining whether the response text pattern matches a fingerprint regular expression text pattern, or determining whether the response text pattern matches the fingerprint text pattern in any other appropriate way. In the event it is determined that the response indicates a text pattern matching the fingerprint text pattern, control passes to 1104. In 1104, the process indicates that the response matches the fingerprint criterion, and the process ends. In the event it is determined in 1102 that the response does not indicate a text pattern matching the fingerprint text pattern, control passes to 1106. In 1106, the process indicates that the response does not match the fingerprint criterion.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for network mapping Internet connected assets belonging to a client network to identify security vulnerabilities, comprising:
 an interface configured to:
  receive an indication to scan a set of addresses comprising Internet addresses using a fingerprint, the fingerprint comprising a fingerprint criterion type comprising a set of open ports criterion type including a set of port numbers associated with open ports and an encryption certificate criterion type; and
 a hardware processor configured to:
  for an address of the set of addresses:
   receive a response to said scan, said response associated with the address and comprising a set of open ports associated with the address and an encryption certificate;
   fingerprint the address of the set of addresses by determining whether the set of open ports associated with the address matches the set of open ports associated with the fingerprint criterion type and determining whether the encryption certificate matches the encryption certificate criterion type;
   determine that said Internet connected assets associated with the address are part of the client network when the response matches the fingerprint;
   update a client network database with said address to include said Internet connected assets associated with the address as part of the client network; and
  use said client network database to identify said security vulnerabilities in connection with said Internet connected assets belonging to said client network.

2. The system of claim 1, wherein the set of addresses comprises all Internet addresses.

3. The system of claim 1, wherein the set of addresses comprises a predetermined subset of addresses.

4. The system of claim 1, wherein the hardware processor is further to:
for the address of the set of addresses:
request the response, wherein the response is associated with the address of the set of addresses.

5. The system of claim 4, wherein requesting the response comprises requesting the response from a network information database.

6. The system of claim 5, wherein responses stored in the network information database comprise responses compiled by scanning the Internet.

7. The system of claim 6, wherein scanning the Internet comprises providing a payload to a set of Internet addresses.

8. The system of claim 4, wherein requesting the response comprises requesting the response from the address.

9. The system of claim 8, wherein requesting the response from the address comprises providing a payload to the address.

10. The system of claim 1, wherein the fingerprint is associated with the client network.

11. A method for network mapping Internet connected assets belonging to a client network to identify security vulnerabilities, comprising:
receiving an indication to scan a set of addresses comprising Internet addresses using a fingerprint, the fingerprint comprising a fingerprint criterion type comprising a set of open ports criterion type including a set of port numbers associated with open ports and an encryption certificate criterion type; and
for an address of the set of addresses:
receiving, using a hardware processor, a response to said scan, said response associated with the address and comprising a set of open ports associated with the address and an encryption certificate;
fingerprinting the address of the set of addresses by determining whether the set of open ports associated with the address matches the set of open ports associated with the fingerprint criterion type and determining whether the encryption certificate matches the encryption certificate criterion type; and
determining that said Internet connected assets associated with the address are part of the client network when the response matches the fingerprint;
updating a client network database with said address to include said Internet connected assets associated with the address as part of the client network;
using said client network database to identify said security vulnerabilities in connection with said Internet connected assets belonging to said client network.

* * * * *